May 15, 1923.  1,455,729
O. INGMAN
HARROW AND PULVERIZER
Filed Oct. 16, 1919    2 Sheets-Sheet 2
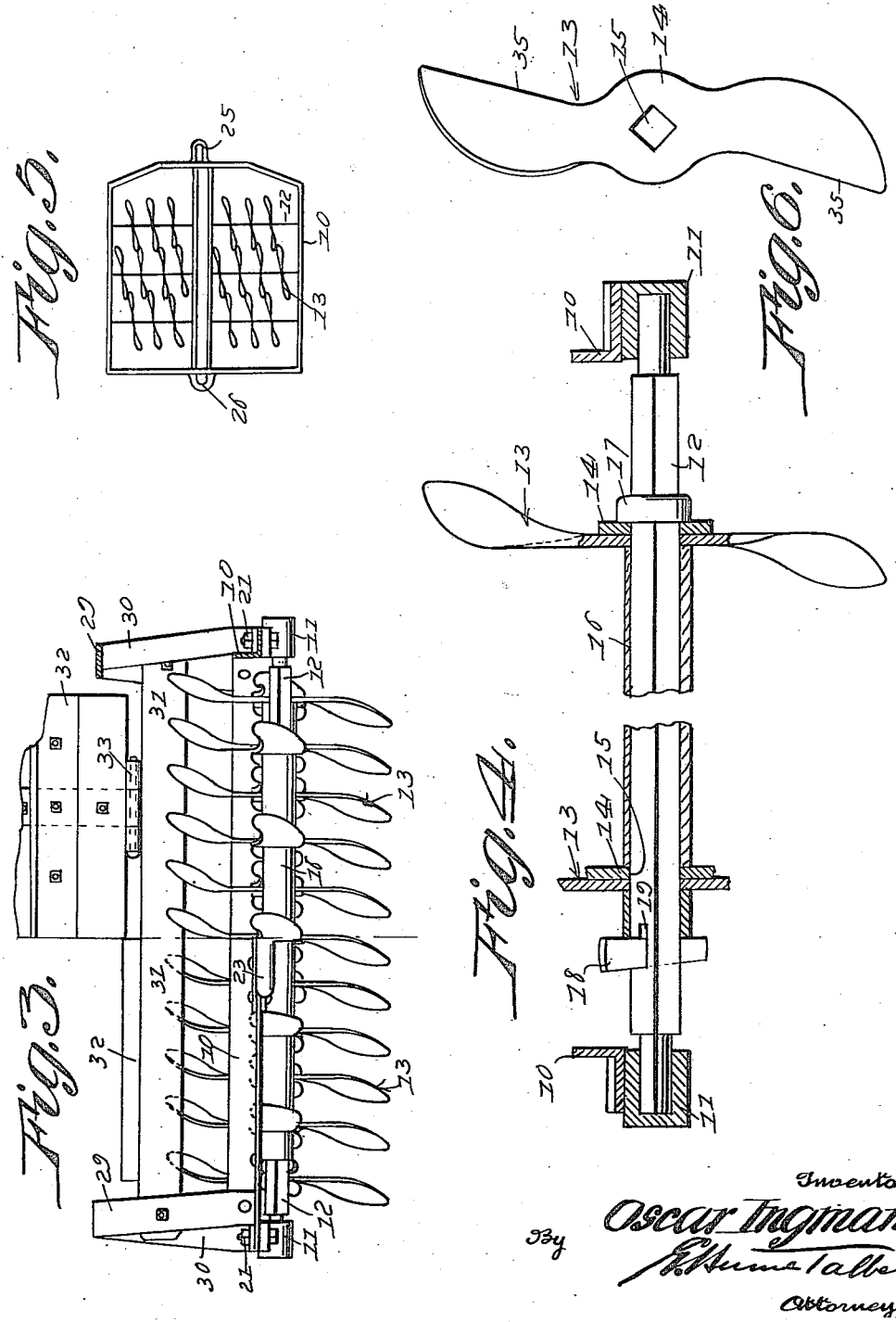

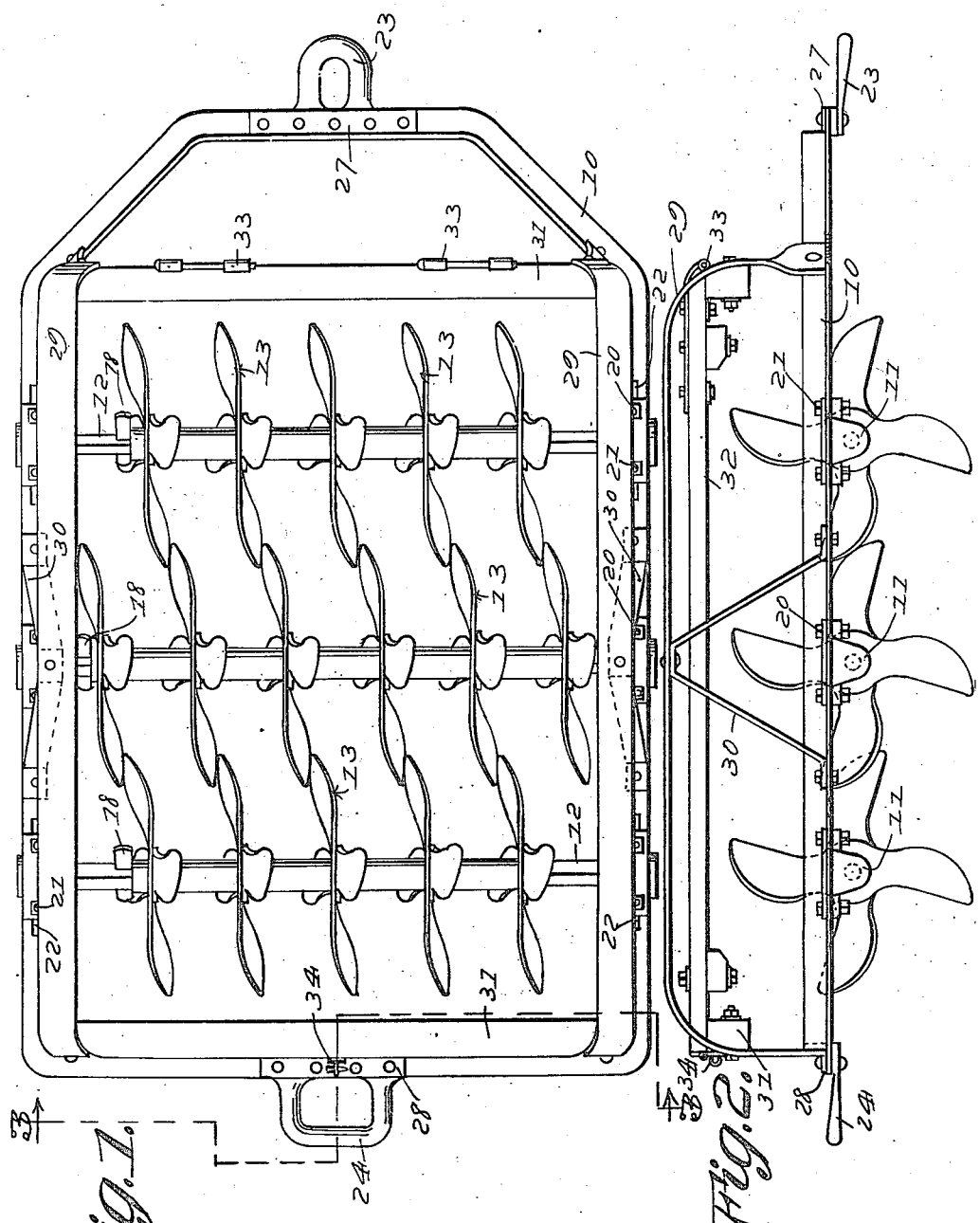

Patented May 15, 1923.

1,455,729

UNITED STATES PATENT OFFICE.

OSCAR INGMAN, OF CALUMET, MICHIGAN.

HARROW AND PULVERIZER.

Application filed October 16, 1919. Serial No. 331,162.

*To all whom it may concern:*

Be it known that OSCAR INGMAN, a citizen of the United States of America, residing at Calumet, in the county of Houghton and State of Michigan, has invented new and useful Improvements in Harrows and Pulverizers, of which the following is a specification.

The object of the invention is to provide relatively efficient means for pulverizing soil and causing a surface shifting of the same, to secure an effective pulverization thereof with the minimum expenditure of power in the matter of draught whether the apparatus is operated by draught animals or a tractor; and furthermore to provide an apparatus of this type which is adapted for transportation with facility to and from the point of service without the employment of auxiliary means such as a truck, sled, or the equivalent thereof.

Further objects and advantages of the invention will appear in the course of the following description of a preferred embodiment of the same, it being understood that changes in form and proportion, and also in relative arrangement of the units thereof, in adapting the same to varying conditions, may be resorted to, within the scope of the appended claims, without departing from the principles involved.

In the drawing:

Figure 1 is a plan view of a single unit apparatus embodying the invention.

Figure 2 is a side view of the same.

Figure 3 is an end elevation partly in section on the plane indicated by the line 3—3 of Figure 1.

Figure 4 is a detail sectional view taken in the plane of one of the blade-carrying shafts to show the means whereby the shafts are mounted and the blades are secured in place thereon.

Figure 5 is a diagrammatic plan view showing the combination of two units arranged abreast.

Figure 6 is a detail view of one of the double bladed knife heads.

Within a suitable supporting frame 10 preferably formed of angle bars or the equivalent thereof and in suitable bearings 11 attached to the side elements of said frame are mounted the extremities of transverse shafts 12 carrying knives or blades 13 preferably formed in pairs to constitute double bladed heads shown in detail in Figure 6, and in practice it is preferred to arrange at least two of these heads in substantially the same plane or with their hubs 14 in contact as shown in Figure 4 by fitting the angular central openings 15 thereof upon the angular (as squared) body portion of the shaft. Two or more of these transverse head-carrying shafts are usually employed in a single unit of the apparatus such as that shown in Figures 1 and 2, the heads of one shaft being disposed in staggered relation with those on the adjacent shaft in front or in rear (or both) thereof, the heads being held at the desired intervals on each shaft by means of spacing sleeves 15 and 16 while the series of heads and spacing sleeves on each shaft is anchored at one end by a fixed collar 17 and at the other end by a tapered key or wedge 18 engaging a slot 19 in the shaft. When, as shown in Figures 1 and 2, three head-bearing shafts are employed the bearings for the intermediate shaft may be permanently bolted as shown at 20 to the side bars or members of the frame while the bolts 21 of the parallel shafts in front and in rear of the intermediate shaft extend through longitudinal slots 22 in the frame bars to permit of adjustment of the front and rear shafts relative to the intermediate shaft, and also to permit of arranging said front and rear shafts either in parallelism with or obliquely with relation to the intermediate shaft to secure the desired relation between the cutting edges of the blades on the adjacent shafts.

Whereas a single unit such as illustrated in Figures 1 and 2 may be employed independently or as a complete apparatus, it is obvious that two or more of these units may be combined as indicated diagrammatically in Figure 5, in which event the zone of operation of the machine may be multiplied as desired without materially affecting the relative arrangement of the pulverizing elements represented by the blades, and whereas when a single unit is employed a draught eye 23 should be arranged at the center of the front end of the frame and a grip 24 at the center of the rear end of the frame, the corresponding draught and grip elements 25 and 26 should be arranged at the centers of the front and rear ends of the group of units when two or more are combined. Splice bars or plates 27 and 28 may, as shown in Figures 1 and 2, be arranged to span the joints between the extremities of the beams of which the side bars or members of the frame are formed.

Extending from and supported by the main frame are the side runner frames 29 connected with the main frame at an intermediate point by the braces 30 and supporting transverse sleepers 31 which serve to stiffen the main frame and also form supports for a platform 32 which is preferably hinged at one end as shown at 33 and is secured at the opposite end by means of a latch 34. The platform serves as a support for the operator and obviously may be provided with a seat, and at the same time it serves to prevent the scattering of the soil due to the operation of the pulverizing blades, while upon reversal of the apparatus to bring the runners into contact with the ground the machine may be moved to and from the point of service without having the pulverizing blades in position to engage the soil, and obviously without the employment of auxiliary supporting means such as a truck or sled.

The pulverizing heads are designed to turn freeely by contact with the soil and each blade as shown clearly in Figure 6 is of volute form, the concave surfaces of alternate blades facing in opposite directions and with their cutting edges 35 arranged on radial lines with relation to the axis of the shaft supporting the same or the axis of movement of the blade. Also preferably the blades are arranged in groups consisting of four or more as shown in the drawings, and when the blades are arranged in pairs as shown in Figure 6 to form double bladed heads, a pair of the heads may be arranged in positons at an angle of ninety degrees from each other to insure the engagement of a following blade with the soil before the preceding blade entirely leaves the same.

Moreover the volute curvature of the blades disposes the radial cutting edges of the blades carried by one shaft in substantially shearing relation with the cutting edges of the blades on the adjacent shaft, the diametrically opposite blades on each shaft being thus brought into shearing relation alternately with the blades of different heads on the adjacent shaft. The result of this operation of the blades is not only to insure the mutual cleaning of the blades as they pass each other, but the contact of the blades with all portions of the surface traversed and the alternate shifting back and forth laterally of the soil owing to the opposite curvature of the different blades following each other in rapid succession to effectively pulverize the soil.

What is claimed is:

1. A harrow and pulverizer having rotary knife heads disposed in tandem relation and each consisting of a plurality of oppositely facing volute blades having the cutting edges of the blades of one head arranged in shearing relation with the cutting edges of the blades of the other head.

2. A harrow and pulverizer having transversely arranged series of rotary cutter heads each consisting of soil engaging radial blades of volute form with their concaved sides facing alternately in opposite directions, and with the cutting edges of the blades in one series disposed in shearing relation with the cutting edges of the blades in the other series.

3. A harrow and pulverizer having intermediate and front and rear shafts, cutter heads arranged in series respectively upon said shafts, each cutter head consisting of a plurality of radial blades of volute formation with the cutting edges of alternate blades disposed in different radial planes and with the concave surfaces thereof facing in opposite directions, the cutting edges of the blades in the heads of one series being disposed in shearing relation with the cutting edges of the alternate blades of alternate heads in the adjacent series.

4. A harrow and pulverizer having a frame, a plurality of shafts disposed transversely of the frame and having their bearings mounted for adjustment to vary the relation between the shafts, cutter heads arranged in series upon each shaft, each cutter head consisting of a plurality of radial blades of volute curvature disposed with their cutting edges in shearing relation respectively with the cutting edges of the alternate blades of alternate heads carried by the adjacent shaft.

5. A harrow and pulverizer having a main frame, shafts mounted transversely in said frame and carrying cutter heads, runner frames secured to the main frame to support the latter in a reversed position, a hinged platform supported by the runner frame parallel with the plane of said shafts, and between the same and the plane of the runners and means for securing said platform in its normal position.

6. A harrow and pulverizer having a main frame provided with bearings, shafts arranged transversely of the frame and terminally mounted in said bearings, the body portions of the shafts being of cross-sectionally irregular form, cutter heads consisting of opposite curved volute blades provided with central openings engaging the body portion of said shafts. tubular spacers interposed between the heads to determine the relative positions thereof upon the shaft and terminal fixed and removable securing means consisting respectively of a collar and a wedge key for engaging the extremities of a group of heads and spacers upon each shaft.

In testimony whereof he affixes his signature.

OSCAR INGMAN.